United States Patent
Wu et al.

(10) Patent No.: US 10,531,313 B2
(45) Date of Patent: Jan. 7, 2020

(54) METHOD AND SYSTEM FOR GENERATING AND PROCESSING USER-EQUIPMENT-TO-USER-EQUIPMENT PROBE SIGNAL

(71) Applicants: Huan Wu, Ottawa (CA); Eddy Shi-Ning Hum, Ottawa (CA)

(72) Inventors: Huan Wu, Ottawa (CA); Eddy Shi-Ning Hum, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 370 days.

(21) Appl. No.: 15/211,084

(22) Filed: Jul. 15, 2016

(65) Prior Publication Data
US 2018/0020364 A1 Jan. 18, 2018

(51) Int. Cl.
*H04W 24/02* (2009.01)
*H04W 72/04* (2009.01)
(Continued)

(52) U.S. Cl.
CPC .......... *H04W 24/02* (2013.01); *H04B 17/318* (2015.01); *H04B 17/336* (2015.01); *H04B 17/364* (2015.01); *H04J 11/0026* (2013.01); *H04L 5/0048* (2013.01); *H04L 5/0051* (2013.01); *H04L 5/16* (2013.01); *H04L 43/12* (2013.01); *H04W 72/0446* (2013.01); *H04W 72/0453* (2013.01); *H04W 72/1284* (2013.01);
(Continued)

(58) Field of Classification Search
CPC combination set(s) only.
See application file for complete search history.

(56) References Cited

U.S. PATENT DOCUMENTS

| 2012/0134275 A1* | 5/2012 | Choi | H04L 5/0057 370/241 |
| 2014/0169232 A1 | 6/2014 | Aggarwal et al. | |

(Continued)

FOREIGN PATENT DOCUMENTS

| CN | 105188147 A | 12/2015 |
| EP | 2858398 A1 | 4/2015 |

(Continued)

OTHER PUBLICATIONS

D. Bharadia, and S. Katti, "Full Duplex MIMO Radios," Proceedings of NSDI'14, Apr. 2014, pp. 1-13.

(Continued)

*Primary Examiner* — Yee F Lam

(57) ABSTRACT

A method that comprises identifying a group of user equipment (UEs) in a radio access network, where the group includes a transmitting UE and a plurality of receiving UEs. The method further comprises sending control information including probe signal parameters to the transmitting UE and to the receiving UEs. The method also comprises receiving, from the receiving UEs, performance metrics relating to receipt of a probe signal sent by the transmitting UE based on the probe signal parameters. The method may be implemented by a scheduler. As such, based on the feedback received, the scheduler may carry out more judicious pairing of UEs for uplink and downlink transmission, which may be particularly suitable when the UEs communicate in half-duplex fashion.

25 Claims, 11 Drawing Sheets

(51) Int. Cl.

| | |
|---|---|
| *H04W 72/12* | (2009.01) |
| *H04W 88/02* | (2009.01) |
| *H04B 17/318* | (2015.01) |
| *H04B 17/336* | (2015.01) |
| *H04L 5/16* | (2006.01) |
| *H04L 12/26* | (2006.01) |
| *H04L 5/00* | (2006.01) |
| *H04J 11/00* | (2006.01) |
| *H04B 17/364* | (2015.01) |

(52) U.S. Cl.
CPC ....... *H04W 72/1289* (2013.01); *H04L 5/0007* (2013.01); *H04W 88/02* (2013.01)

(56) References Cited

U.S. PATENT DOCUMENTS

| | | | | |
|---|---|---|---|---|
| 2014/0169310 | A1* | 6/2014 | Ma | H04W 56/002 370/329 |
| 2014/0293968 | A1* | 10/2014 | Ebrahimi Tazeh Mahalleh | H04W 56/001 370/336 |
| 2015/0382375 | A1* | 12/2015 | Bhushan | H04L 5/0005 370/252 |
| 2016/0029333 | A1* | 1/2016 | Seo | H04L 27/2655 370/350 |
| 2016/0174235 | A1* | 6/2016 | Fong | H04B 7/024 370/329 |
| 2016/0198455 | A1* | 7/2016 | Caretti | H04B 17/318 370/329 |
| 2016/0270088 | A1* | 9/2016 | Martin | H04W 76/14 |
| 2017/0034837 | A1* | 2/2017 | Lopez-Perez | H04W 72/1231 |
| 2017/0063503 | A1* | 3/2017 | Liu | H04L 5/0044 |

FOREIGN PATENT DOCUMENTS

| | | |
|---|---|---|
| EP | 2919411 A1 | 9/2015 |
| EP | 2938148 A1 | 10/2015 |

OTHER PUBLICATIONS

M. Duarte, et al., "Design and Characterization of a Full-Duplex Multiantenna System for WiFi Networks," IEEE Trans. VT, vol. 63, Mar. 2014, pp. 1160-1177.

S. Hong, et al, "Applications of Self-Interference Cancellation in 5G and Beyond," IEEE Communications Magazine, Feb. 2014, pp. 114-121.

* cited by examiner

| Resource block ID | Time frame | Frequency carrier | Transmitting entity (or entities) | Receiving entity (or entities) |
|---|---|---|---|---|
| RB1 | T1 | F1 | BS1, UE1 | BS1, UE2 |
| RB2 | T2 | F1 | BS1, UE2 | BS1, UE3 |
| RB3 | T4 | F2 | BS1, UE3 | BS1, UE1 |

FIG. 4

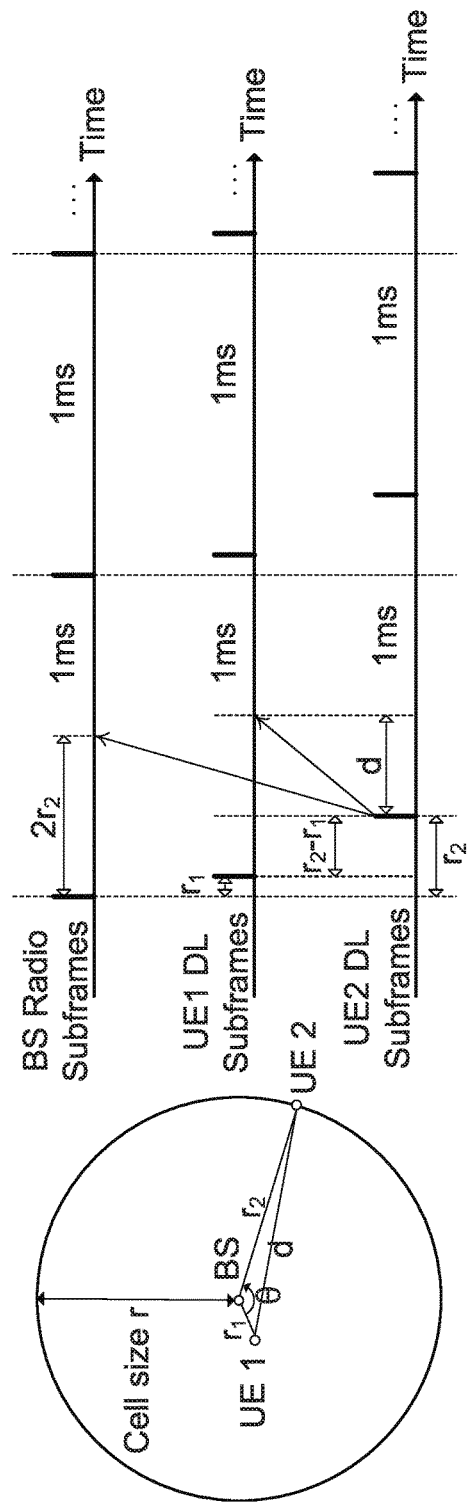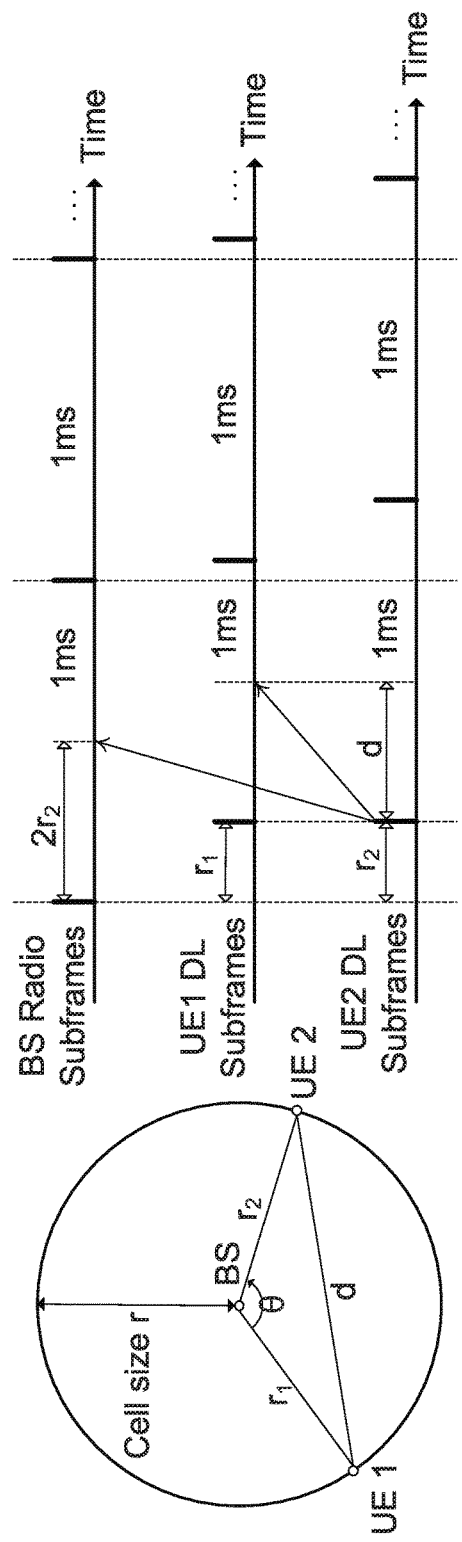
FIG. 9A
FIG. 9B

METHOD AND SYSTEM FOR GENERATING AND PROCESSING USER-EQUIPMENT-TO-USER-EQUIPMENT PROBE SIGNAL

FIELD

The present invention relates generally to wireless networks and, in particular, to communications between a base station and user equipment, and among user equipment, in a radio access network.

BACKGROUND

In certain wireless radio access networks, a base station communicates with user equipment (UEs) in full-duplex mode while the UEs communicate with the base station in half-duplex (HD) mode. The full-duplex capability of the base station allows the base station to communicate simultaneously, and within the same frequency band, with two UEs, say, a first UE in the uplink direction and a second UE in the downlink direction.

However, transmission of uplink traffic from the first UE will tend to interfere with reception of downlink traffic at the second UE, depending on various factors such as the relative distance between the two UEs. As such, when there are many UEs that may communicate with the base station in half-duplex fashion, judicious pairing of UEs for uplink and downlink transmission using the same time and frequency resources may improve performance.

SUMMARY

According to a first broad aspect, there is provided a method that comprises identifying a group of user equipment (UEs) in a radio access network, the group including a transmitting UE and a plurality of receiving UEs; sending control information including probe signal parameters to the transmitting UE and to the receiving UEs; and receiving, from the receiving UEs, performance metrics relating to receipt of a probe signal sent by the transmitting UE based on the probe signal parameters.

According to a second broad aspect, there is provided a method for execution by user equipment (UE) in a radio access network, that comprises receiving control information including probe signal parameters from a base station in the radio access network; generating a probe signal in accordance with the probe signal parameters; and sending the probe signal to at least one other UE in the radio access network.

According to a third broad aspect, there is provided a method for execution by user equipment (UE) in a radio access network, that comprises receiving a probe signal from a transmitting UE in the radio access network; determining a performance metric relating to receipt of the probe signal; and sending the performance metric to a scheduler connected to the radio access network.

According to a fourth broad aspect, there is provided a method that comprises identifying a plurality of groups of user equipment (UEs) in a radio access network, each group including one transmitting UE and a plurality of receiving UEs; sending control information including probe signal parameters to the transmitting UE and to the receiving UEs in each group; and receiving, from the receiving UEs in each particular group, performance metrics relating to receipt of a probe signal sent by the transmitting UE in the particular group.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the accompanying drawings:

FIG. 4 is a table showing an example association of between resource blocks and transmitting and receiving entities;

FIGS. 9A and 9B illustrate propagation delay for two different UE placements in a cell;

It is to be expressly understood that the description and drawings are only for the purpose of illustration of certain embodiments of the invention and are an aid for understanding. They are not intended to be a definition of the limits of the invention.

DETAILED DESCRIPTION

Figure 1:
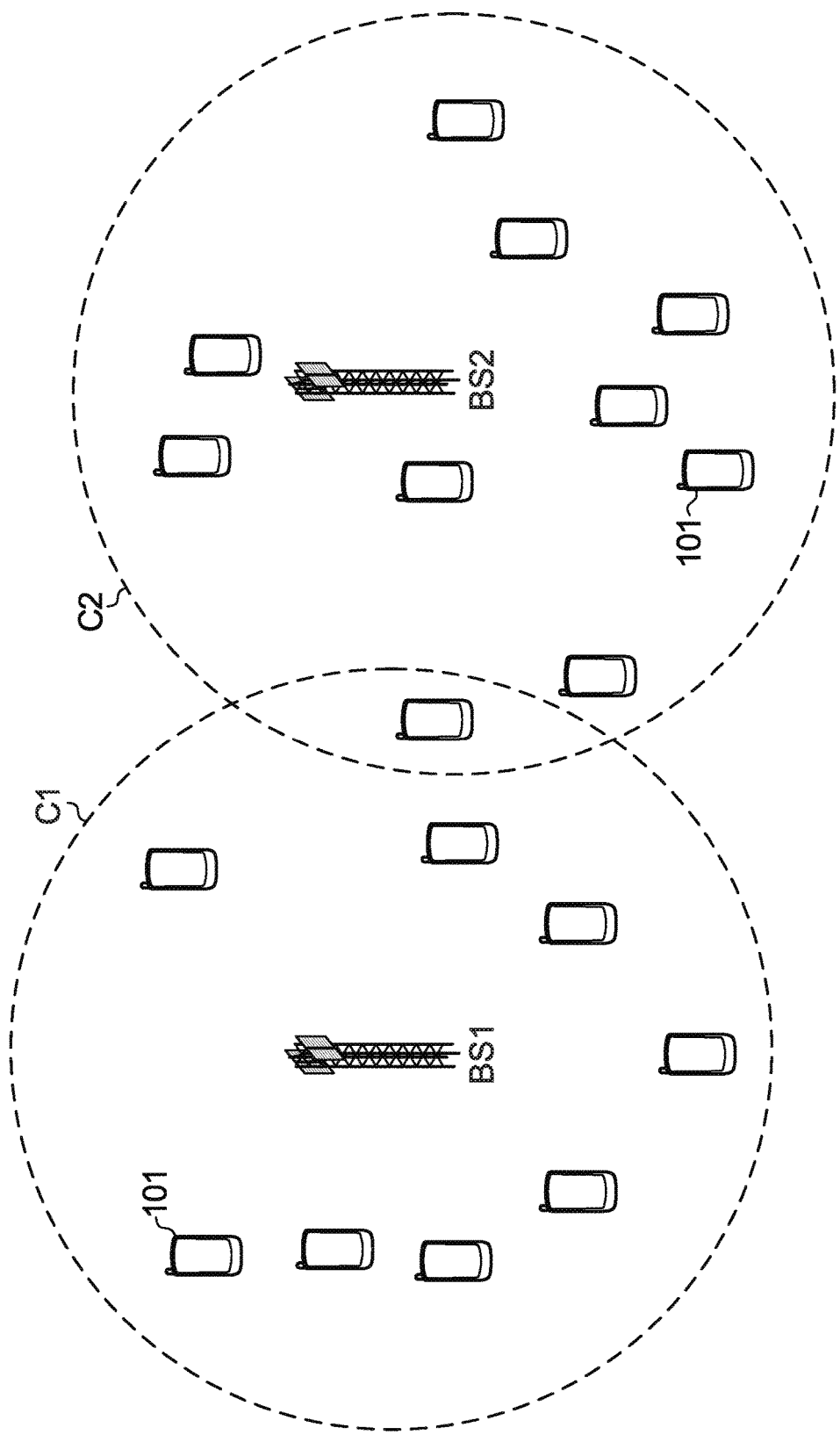
FIG. 1 is a block diagram of a radio access network showing a plurality of base stations and corresponding cells and UEs within those cells.

With reference to FIG. 1, there is shown a radio access network 110 that may be capable of supporting various non-limiting embodiments of the present invention. In particular, there is shown a plurality of base stations BS1, BS2 that communicate with mobile user equipment (UEs) 101 over a wireless medium using, e.g., electromagnetic waves such as radio-frequency technology. The base stations BS1, BS2 are connected to a core network using, for example, fixed high-capacity links such as fiber-optic links, for example. Only two base stations BS1, BS2 are shown for simplicity, but it should be understood that there is no particular limit on the number of base stations in the radio access network.

Individual base stations are assigned to communicate with corresponding UEs based on factors such as received signal strength. The notion of a "cell" associated with a particular base station thus pertains to the set of UEs that are geographically proximate the particular base station and with which the base station may directly communicate. In the embodiment of FIG. 1, there are two cells, namely cell C1 associated with base station BS1 and cell C2 associated with base station BS2. UEs that are on or near the border of two cells associated with different base stations (or within an intersection of two cells) may communicate with the base station associated with either of the two cells, depending on various operational factors. As a UE migrates from one cell to another, communication switches over to the base station associated with the new cell using a process known as handoff.

The UEs 101 can take on various forms. In one non-limiting embodiment, the UEs 101 may be smartphones, tablets, laptops, vehicle-mounted communication devices, or a variety of such devices in different proportions throughout the radio access network. Each UE 101 is equipped with hardware, software and/or control logic to execute a variety of functions. For example, the UEs 101 may be equipped with an RF communication unit (including antenna(s), demodulator, processor, etc.) for establishing and/or maintaining a radio link with a base station. The UEs 101 may further include data decoder to decode symbols received from the RE communication unit into data streams and a data encoder to encode a data stream into symbols for transmission to the base station via the RE communication unit. The data streams themselves are processed by a computing device in the UE 101. To this end, the computing device comprises a processor, a memory, one or more buses (e.g., data bus, control bus, etc.) and an I/O interface. The I/O interface, in addition to interfacing with the data encoder and data decoder, interfaces with a user of the UE 101 via one or more input and/or output devices, such as a touch screen, a microphone, a loudspeaker, a keyboard, etc.

Figure 2:
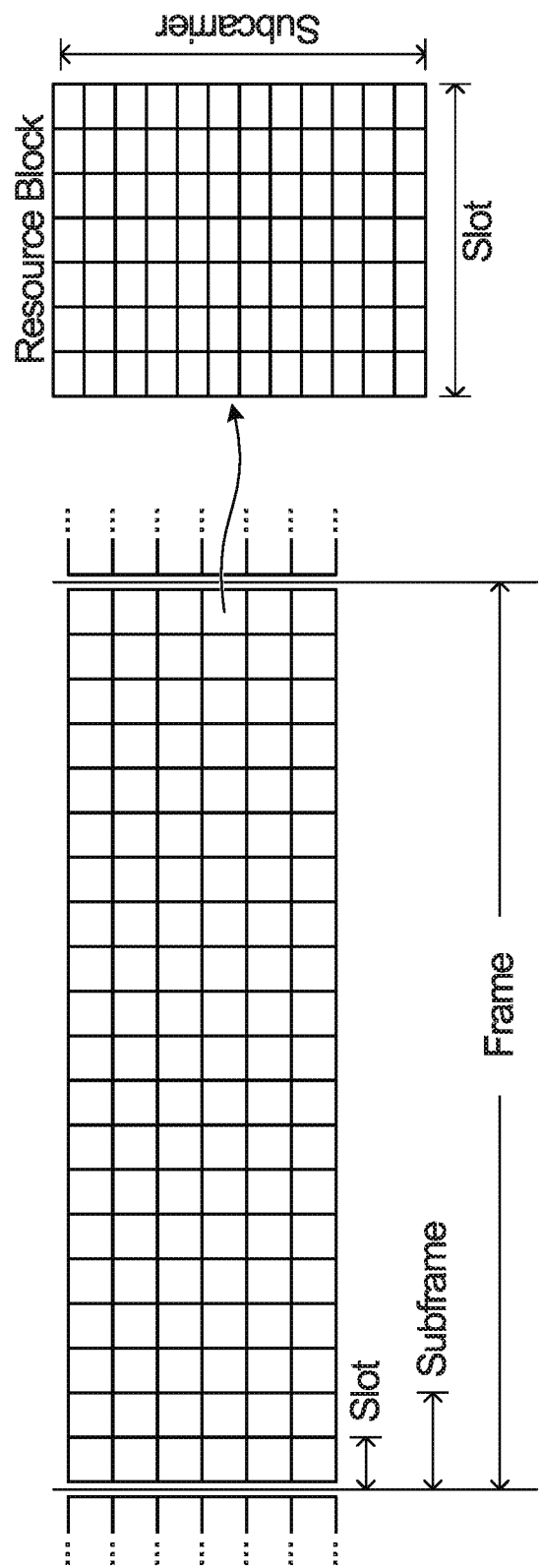
FIG. 2 schematically illustrates resource blocks.

Considering now a particular base station and its associated UEs, communication between the base station and the UEs occurs over portions of the RF spectrum known as "resource elements" or "resource blocks" containing multiple resource elements. That is to say, and with reference to FIG. 2, time and frequency are divided into frames and carriers, respectively. A time frame may be divided into subframes, which may in turn be further divided into time slots. One time slot at a particular frequency carrier may be referred to as a resource block. As such, a multiplexing effect with an increased density of communication is obtained because multiple resource blocks (at different frequency carriers) can occupy the same time slot and multiple resource blocks (occupying different time slots) can occupy the same frequency carrier. Multiplexing may also occur within individual resource blocks. For example, considering the resource block associated with a particular time slot and a particular frequency carrier, the time slot may be divided into plural sub-slots, while the frequency carrier may be divided into plural sub-carriers.

Communication from the base stations BS1, BS2 to the UEs 101 is referred to as downlink (DL) communication, while communication from the UEs 101 to the base stations BS1, BS2 is referred to as uplink (UL) communication. Uplink and/or downlink communication may be full-duplex or half-duplex. In full-duplex communication, the same resource block is used by a given RF communication unit for both downlink and uplink communication. That is to say, the same time slot and the same frequency carrier are used by the same RF communication unit both to send communication to a recipient and to receive communication from a sender. The recipient and the sender may be the same entity or they may be different entities. A half-duplex transceiver does not transmit and receive on the same time and frequency resource. That is, the transmission and reception of a half-duplex transceiver can be separated by either frequency or time.

Figure 3:
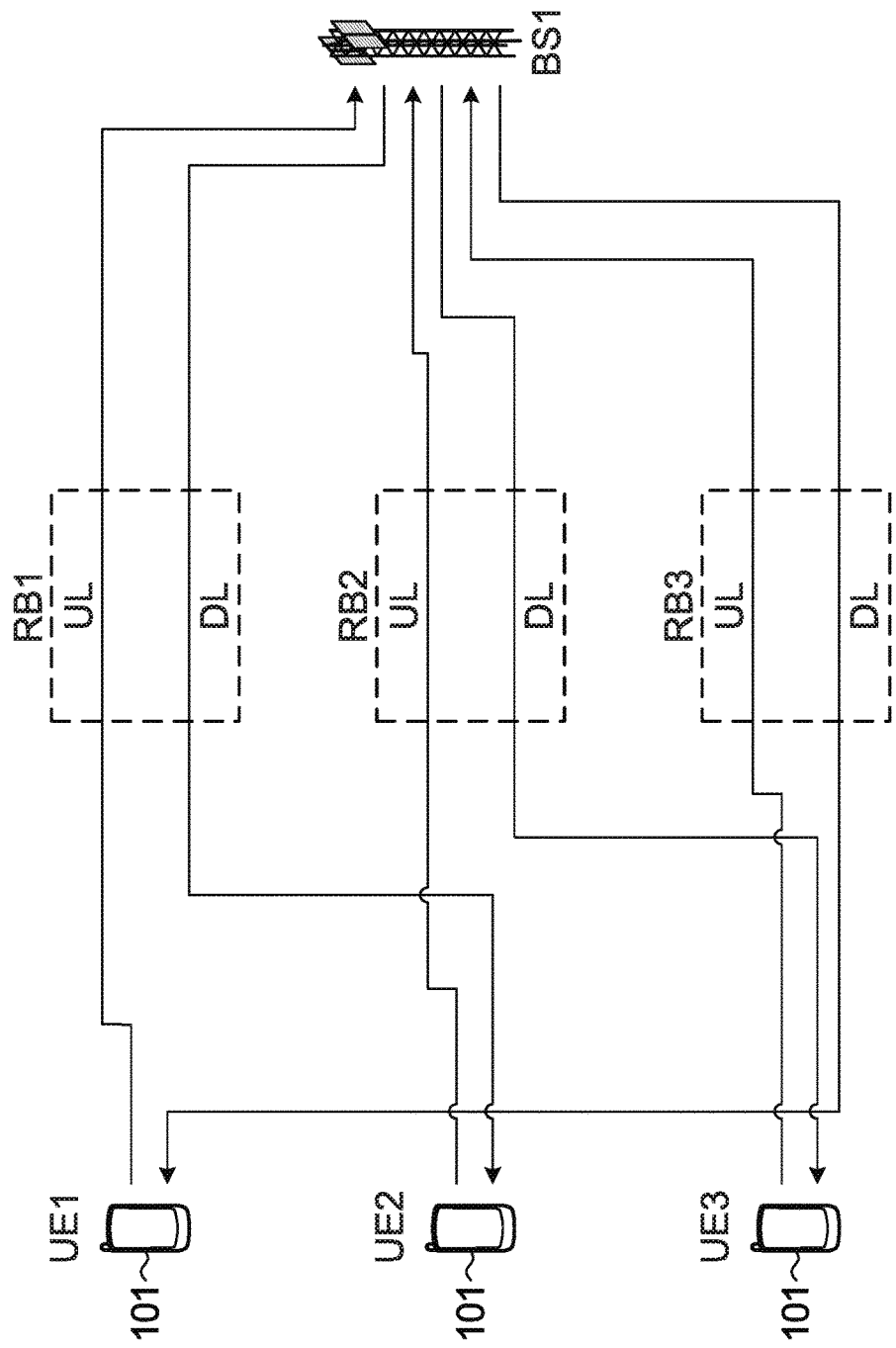
FIG. 3 conceptually illustrates example utilization of resource blocks such as those of FIG. 2 by a base station and UEs such as those of FIG. 1.

In an embodiment, a given one of the base stations BS1, BS2 is in full-duplex communication with its corresponding UEs and the UEs are in half-duplex communication with the base station. Therefore, from the perspective of the base stations BS1, BS2, each resource block is used for both downlink and uplink communication, while from the perspective of the UEs, each resource block is used for only one direction of communication, namely uplink or downlink. This is illustrated in FIG. 3. In this example, there are three resource blocks RB1, RB2, RB3 utilized by base station BS1. Resource block RB1 is utilized by base station BS1 to transmit downlink traffic to UE1 and is utilized by UE2 to transmit uplink traffic to base station BS1. For its part, RB2 is utilized by the base station to transmit downlink traffic to UE3 and by UE2 to transmit uplink traffic to the base station. Finally, RB3 is utilized by the base station to transmit downlink traffic to UE1 and by UE3 to transmit uplink traffic to the base station.

As such, it will be seen that a given resource block is utilized by plural transmitting entities to carry signals in two directions. Due to its full-duplex capabilities, base stations act both in a transmitting and receiving capacity for the same resource block. However, due to the half-duplex nature of the UEs, the UE that transmits uplink traffic to the base station utilizing that resource block is not one of the recipients of the downlink communication from the base station over that resource block.

As such, one can represent the association between resource blocks and transmitting and receiving entities using a table as shown in FIG. 4. Specifically, the table shows resource blocks RB1, RB2, RB3 for various combinations of time slots and frequency carriers. It is seen that each resource block is associated with multiple transmitting entities and multiple receiving entities. A first observation is that, due to its full-duplex capabilities, base station BS1 is always present as both a transmitting and receiving entity for each resource block. That is to say, the intersection between the set of transmitting entities and the set of receiving entities for a given resource block is non-empty. A second observation is that, excluding a broadcast or multicast scenario, base station BS1 communicates with one UE in the uplink direction and a different UE in the downlink direction utilizing the same resource block. If constrained to half-duplex capabilities, the two UEs assigned to the same resource block need to be different and thus it can be said that UEs are "paired" with respect to a given resource block. Such pairing may be implemented by a scheduler as described below.

Figure 5:
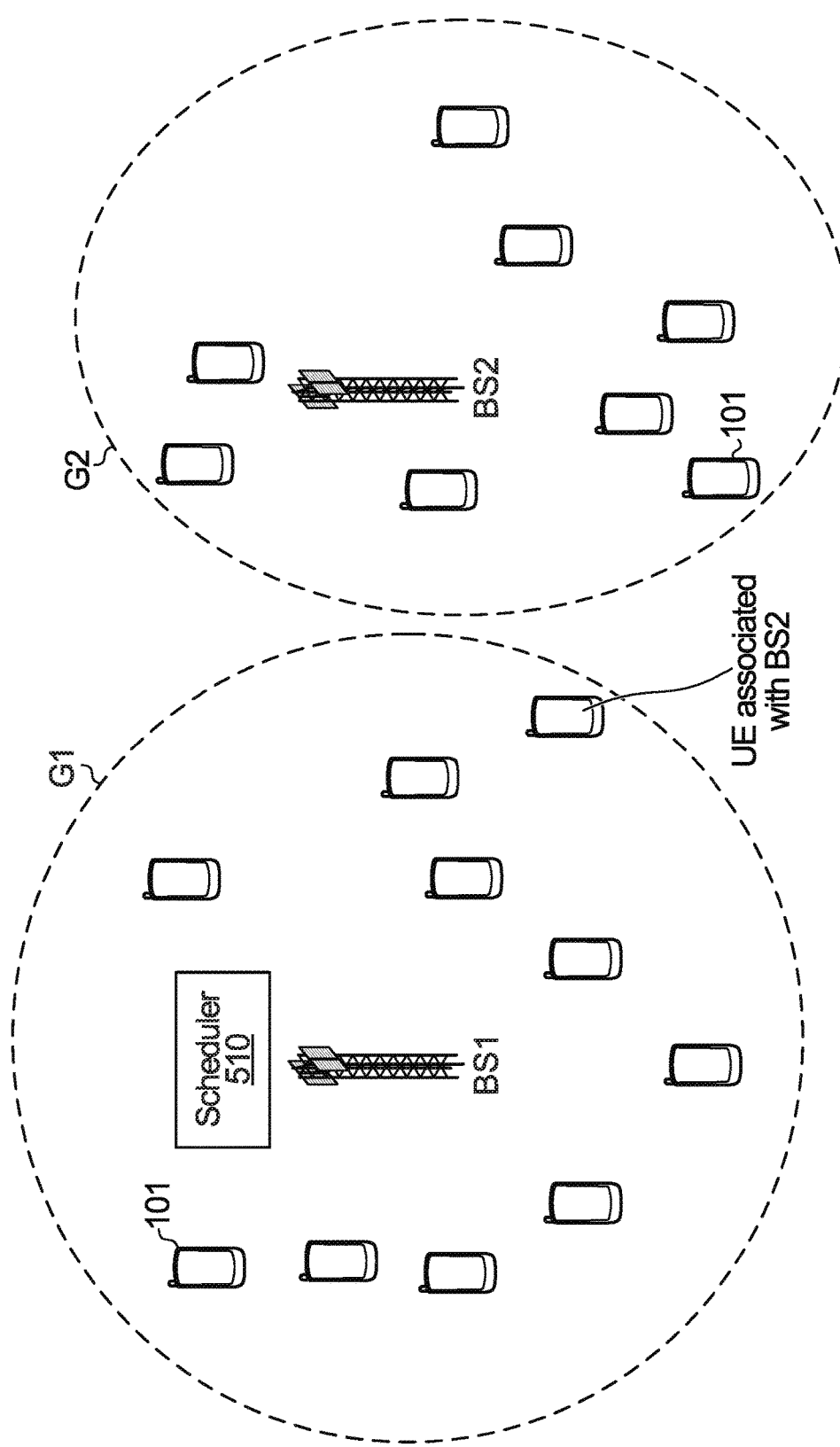
FIG. 5 is a block diagram of the radio access network of FIG. 1 further including a scheduler that defines groups of UEs, in accordance with a non-limiting embodiment of the present invention.

With reference to FIG. 5, a scheduler 510 may be implemented, depending on the embodiment, as a stand-alone software or hardware element in the core network or in one of the base stations or in a central controller of a cloud/centralized radio access network (C-RAN), or the scheduler 510 may be a distributed component. The scheduler 510 may include a processor and a memory. The memory may include computer-readable instructions for operation of the scheduler 510, and may also include data such as associations between resource blocks and transmitting and receiving entities (e.g., the contents of the table in FIG. 4).

The scheduler 510 carries out a scheduling algorithm for groups of UEs. A "group" of UEs may be all UEs within a single cell (and therefore associated with a single base station). In other words, one non-limiting way to delimit a group of UEs is to consider all UEs within a certain maximum radius of a base station to be within the same group. In other embodiments, a group of UEs may cross cell boundaries. For example, FIG. 5 shows groups G1 and G2. These groups are not entirely congruent with the cells of FIG. 1, as for example group G1 includes UEs that actually communicate with base station BS2. The rationale for allowing a group of UEs to include UEs associated with a different base station is that this may facilitate network-wide interference reduction and throughput optimization. As such, the formation of groups, which may be carried out by the scheduler 510, allows a level of abstraction from the cells and therefore reference from now will be mostly made to groups of UEs, in this example, G1 and G2.

An output of the scheduler's 510 implementation of the scheduling algorithm, when considering a particular resource block, is to pair two UEs that are from the same group such that one of the two UEs will transmit traffic to the base station and the other will receive traffic from the base station using the particular resource block. This pairing may be carried out with the objective of minimizing interference from the transmitting UE to the receiving UE. To this end, the scheduling algorithm implemented by the scheduler 510 determines, for each resource block, which of the UEs should be a receiving entity and which of the UEs should be a transmitting entity, keeping in mind that both utilize the resource block to communicate with the base station. Since the UEs are in half-duplex mode, the same resource block will involve the pairing of two different UEs. One method of pairing the UEs is based on one or more parameters measured by the UEs and fed back to the scheduler 510. Since interference between the two UEs is inevitable, one particularly beneficial parameter to measure (and potentially minimize) is mutual UE-to-UE interference.

Figure 6:
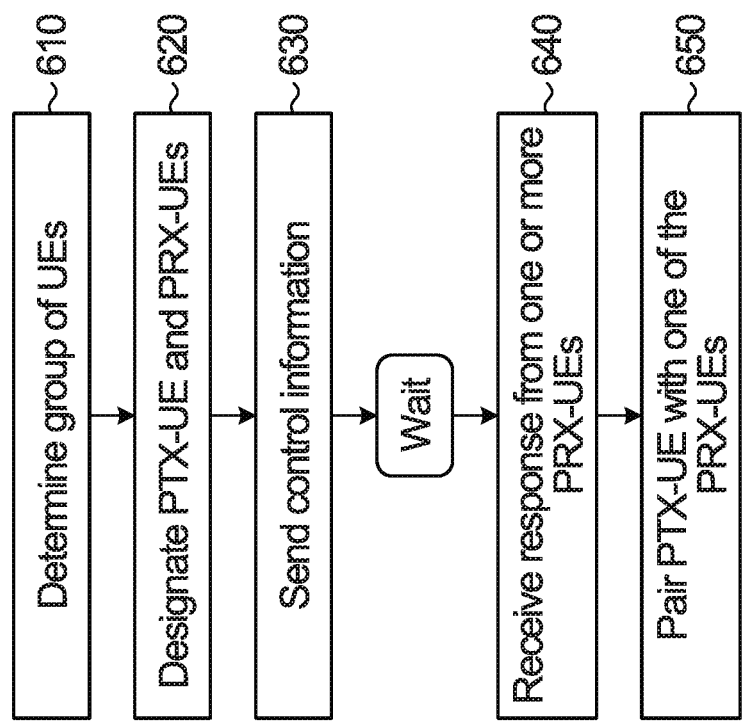
FIG. 6 is a flowchart illustrating operation of the scheduler of FIG. 5, in accordance with a non-limiting embodiment of the present invention.

Specifically, reference is made to FIG. 6, which shows a process implemented by the scheduler 510 in accordance with a non-limiting embodiment of the present invention. At step 610, the scheduler 510 determines a group of UEs. At step 620, the scheduler 510 designates one of the UEs in the group as being the emitter of a "probe signal". This UE is referred to as a probe-emitting UE and is denoted PTX-UE. At least one, if not some or all, of the other UEs in the group are designated as probe-receiving UEs, two of which are denoted PRX-UEa and PRX-UEb. The identity of the probe-emitting UE may be selected in a variety of ways that are not material to the present invention. For example, one way to select the UE that should be the PTX-UE is to consider uplink traffic demanded, that is, a UE is designated to be the PTX-UE when it is the UE having the most requests for uplink resources. At step 630, the scheduler 510 sends control information to the probe-emitting UE and to the probe-receiving UEs. The scheduler then carries on with its other scheduling tasks and eventually, at step 640, the scheduler 510 receives a response message from one or more of the probe-receiving UEs. The response message may include a measurement of a parameter. At step 650, based on feedback on the parameter measurements received from various probe-receiving UEs, the scheduler 510 may determine which probe-receiving UE should be paired with the (previously identified) probe-emitting UE for a given resource block. This pairing is stored in memory (e.g., the memory of the scheduler 510) and then used for subsequent data traffic exchanges with the various UEs in the group.

Figure 7:
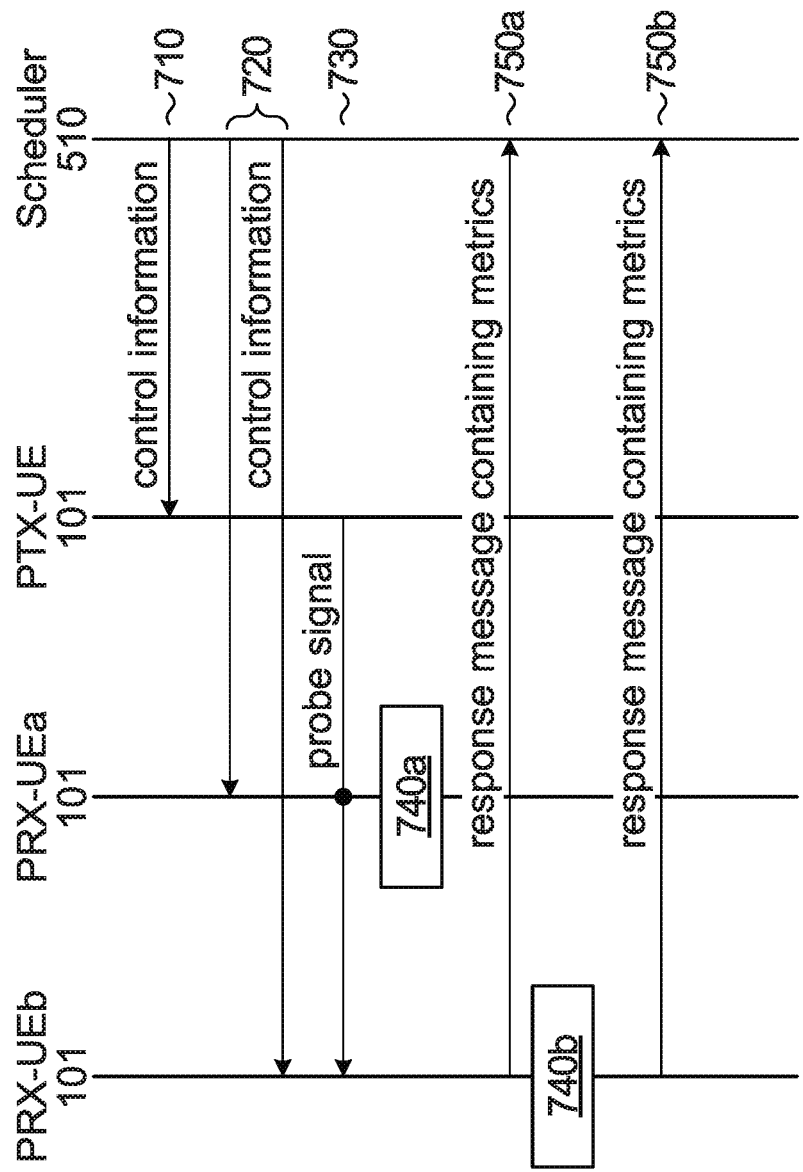
FIG. 7 is a signal flow diagram illustrating an exchange of signals between the scheduler and various UEs in the radio access network of FIG. 5, in accordance with a non-limiting embodiment of the present invention.

Reference is now made to the signal flow diagram in FIG. 7, which shows the scheduler 510, the probe-emitting UE PTX-UE and two probe-receiving UEs PRX-UEa, PRX-UEb, although there may be a greater number of probe-receiving UEs. Flow 710 shows the scheduler 510 sending the control information 790 to the probe-emitting UE via its corresponding base station (not shown). Flow 720 shows the scheduler 510 sending the control information to the probe-receiving UEs via their corresponding base station(s) (not shown). Since the control information is sent to the probe-emitting UE as a downlink communication, the probe-emitting UE is considered to be a receiving entity associated with the resource block utilized to send the control information to the probe-emitting UE. Likewise, since the control information is sent to the probe-receiving UEs as a downlink communication, the probe-receiving UEs are considered to be receiving entities associated with the respective resource blocks utilized to send the control information to the probe-receiving UEs.

The control information includes information regarding a probe signal to be emitted by the probe-emitting UE. As such, some of the control information sent to the probe-emitting UE at step 710 may be different from the control information sent to the probe-receiving UEs at step 720, since the control information sent to the probe-emitting UE at step 710 may be related to transmission of the probe signal and the control information sent to the probe-receiving UEs at step 720 may be related to reception of the probe signal.

At flow 730, a probe signal is emitted by the probe-emitting UE. The resource block utilized to transmit the probe signal from the probe-emitting UE (PTX-UE) may be referred to as a probe signal resource block. Information pertaining to this resource block may be contained in the control information sent by the scheduler 510 at step 630.

It should be appreciated that the probe signal is sent neither as an uplink communication nor as a downlink communication. Rather, it is a direct UE-to-UE (or peer-to-peer) communication. As such, neither the entity that transmits the probe signal using the probe signal resource block nor the entity (or entities, of which there may be many) that receives the probe signal using the probe signal resource block is the base station. That is to say, the intersection between the set of transmitting entities and the set of receiving entities for the probe signal resource block is empty. Stated differently, the base station does not utilize the probe signal resource block, and does not transmit or receive the probe signal, and transmission of the probe signal does not go through the base station.

Figure 11A:
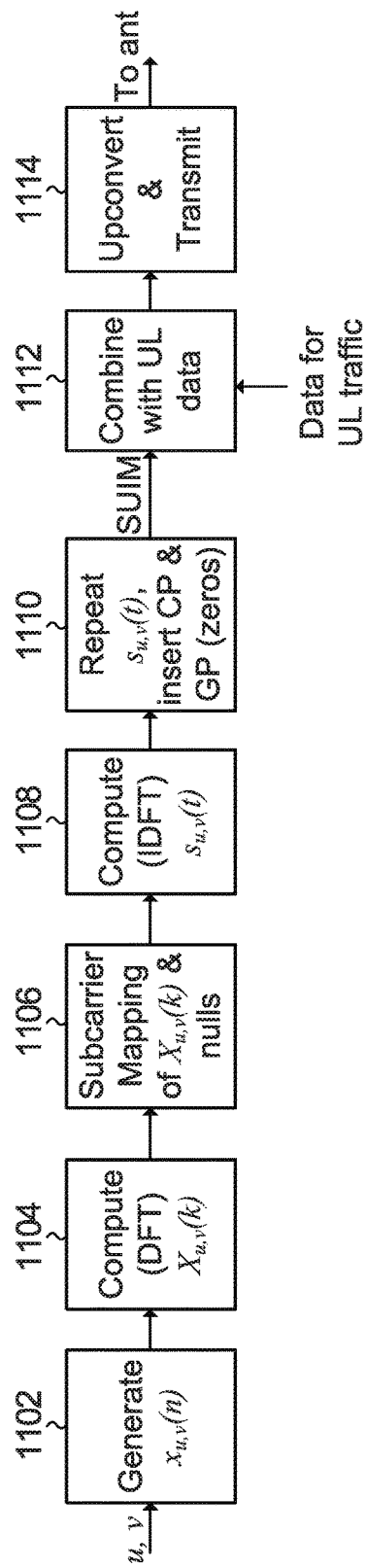
FIG. 11A is a block diagram illustrating probe signal generation by a UE, in accordance with a non-limiting embodiment of the present invention.

Reference is now made to FIG. 11A, which is a block diagram of a system for transmitting a probe signal from the probe-emitting UE such as PTX-UE. In a non-limiting embodiment, at block 1102, the probe-emitting UE generates a sequence $x_{u,v}(n)$. (Further details about the properties of the sequence will be given later on.) At block 1104, the discrete Fourier transform (DFT) is taken, which yields the frequency-domain signal $X_{u,v}(k)$. At block 1106, this signal is mapped to the sub-carriers of the resource block's frequency carrier, leaving some sub-carriers null. The mapping used for this purpose may be received from the scheduler 510 as part of the control information and stored in the memory of PTX-UE. At block 1108, the inverse DFT (IDFT) is computed of the sub-carrier-mapped frequency-domain signal, which yields a time-domain signal $s_{u,v}(t)$, hereinafter referred to as a "base symbol". In an embodiment, as shown at block 1110, the base symbol is repeated, a cyclic prefix and guard period are inserted in order to form the probe signal, which now occupies a complete time slot and frequency carrier. At block 1112, the probe signal is then combined with other uplink traffic that the probe-emitting UE may be scheduled to send to the base station using different time slots and/or frequency carriers, resulting in a multiplexed signal that is upconverted, as shown at block 1114, and transmitted over the radio access network via an antenna of the probe-emitting UE.

Returning now to FIG. 7, at step 740a, the probe signal is received by the probe-receiving UEs, namely PRX-UEa and PRX-UEb in this example. As such, PRX-UEa and PRX-UEb measure a parameter or metric of the probe signal. One example of a parameter that may be measured by PRX-UEa and/or PRX-UEb is received signal strength. Another example of a parameter that may be measured by PRX-UEa and/or PRX-UEb is signal-to-noise ratio. In yet another example, PRX-UEa and/or PRX-UEb attempt to demodulate and decode the original sequence $x_{u,v}(n)$ in order to determine an error rate. In either case, the parameter that is being measured may be an indication of interference from PTX-UE.

Figure 11B:
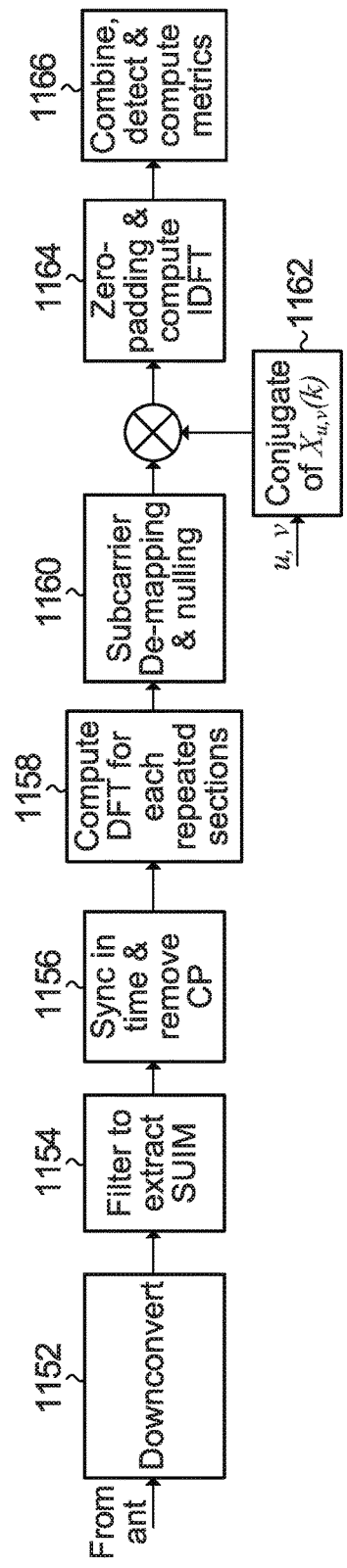
FIG. 11B is a block diagram illustrating processing of a received probe signal by a UE, in accordance with a non-limiting embodiment of the present invention.

With reference to FIG. 11B, there is shown a block diagram of a system for processing a received probe signal at a probe-receiving UE such as PRX-UEa or PRX-UEb. Firstly, a radio frequency signal containing the probe signal is received at the antenna of the probe-receiving UE and is down-converted, as shown at block 1152. At block 1154, a narrowband frequency filter is applied to extract the carrier containing the probe signal. Knowledge of the carrier will have been gained from the control signal received during flow 720. Then, at block 1156, the probe-receiving UE carries out synchronization to eliminate the guard period and cyclic prefix and recover a time section which, in an embodiment, may include several time sections containing a symbol that has been repeated to facilitate detection thereof. At block 1158, the DFT of each time section is computed to reveal the contents at different sub-carriers and, at block 1160, these contents are de-mapped based on knowledge of the original mapping used by the probe-emitting UE. After de-mapping, the resulting signal in the frequency domain is multiplied with the conjugate of the original frequency domain signal (k), as shown at block 1162, in order to yield a signal for which the IDFT is now computed (with zero-padding added, as needed), as shown at block 1164, so as to determine a metric pertaining to the probe signal, as shown at block 1166, such as the signal strength, signal-to-noise ratio or error rate.

The received signal strength is a measure of total power of received signal, receiver noise and other interference. It is good indicator of the strength of the received probe signal when all the PRX-UEs have a relatively constant noise plus interference level. The signal-to-noise-ratio is the power ratio of the received probe signal to the noise plus interference. When combining the two, the true strength of the probe signal can be derived. The error rate, which is closely related to the detection probability, can also be an indicator of quality of the received probe signal. It is up to the scheduler 510 to request any of those metrics to be measured and fed back by the PRX-UEs. It is also up to the scheduler 510 how to make use of the metrics to have a robust measure of the interference level of the PTX-UE at each of the PRX-UE. These are aspects of scheduler design. When time sections are repeated instances of the same base symbol, then information for multiple time sections may be combined for a more accurate or robust overall measurement.

Returning to FIG. 7, at flow 750a, PRX-UEa sends the measured parameter to the scheduler 510 in a response message. This can be achieved by PRX-UEa utilizing a resource block for uplink communication to the corresponding base station (not shown). At flow 750b, PRX-UEb sends the measured parameter to the scheduler 510 in a response message. This can be achieved by PRX-UEb utilizing a resource block for uplink communication to the corresponding base station (not shown), which is different from the resource block used by PRX-UEa for sending its response message to the scheduler 510 in flow 750a.

Based on the response messages received via flows 750a and 750b, the scheduler 510 then executes step 650 as previously described, in order to process the measured parameters and carry out a pairing of UEs. In particular, based on the probe signal feedback loop described above, it is possible for the scheduler 510 to identify the probe-receiving UE that has the least interference from PTX-UE. This identified probe-receiving UE would then be paired together with PTX-UE.

It should be appreciated that, where a particular first UE is the probe-emitting UE and is paired with a particular second UE as the probe-receiving UE with the least amount of interference from the first UE, the first UE may be associated with downlink usage of a particular assigned resource block and the second UE may be associated with uplink usage of the particular assigned resource block. In other embodiments, it may be the exact opposite. Also, the particular resource block to which the first and second UEs are assigned need not be the same one that was used by the first UE when emitting its probe signal, but rather the selection of the particular assigned resource block can be arbitrarily left to the scheduler 510 depending on resource needs and availability. In other words, it may be acceptable to assume that relative interference performance does not vary significantly across resource blocks available to the base station UEs.

It should be further appreciated that the scheduler may send a signal (over a downlink traffic channel) instructing the probe-emitting UE to transmit uplink traffic (to its associated the base station) over the assigned resource block and may send a signal (also over a downlink traffic channel) instructing the selected one of the probe-receiving UEs to receive downlink traffic (from its associated base station, which may be the same or different) over the assigned resource block. Of course, the base station(s) itself (themselves) would also be advised of the appropriate resource block assignment.

Further, in the previous example, it should be appreciated that the control information sent to PTX-UE as well as to PRX-UEa and PRX-UEb may include information that allows the proper transmission and reception of the probe signal. This can include information specifying the probe signal resource block (e.g., time slot ID and frequency carrier ID). In addition, this can include a probe signal ID, which corresponds to characteristics or parameters of the probe signal itself. To this end, one can consider different formulations of the probe signal, each having its own set of parameters or characteristics.

Figure 8:
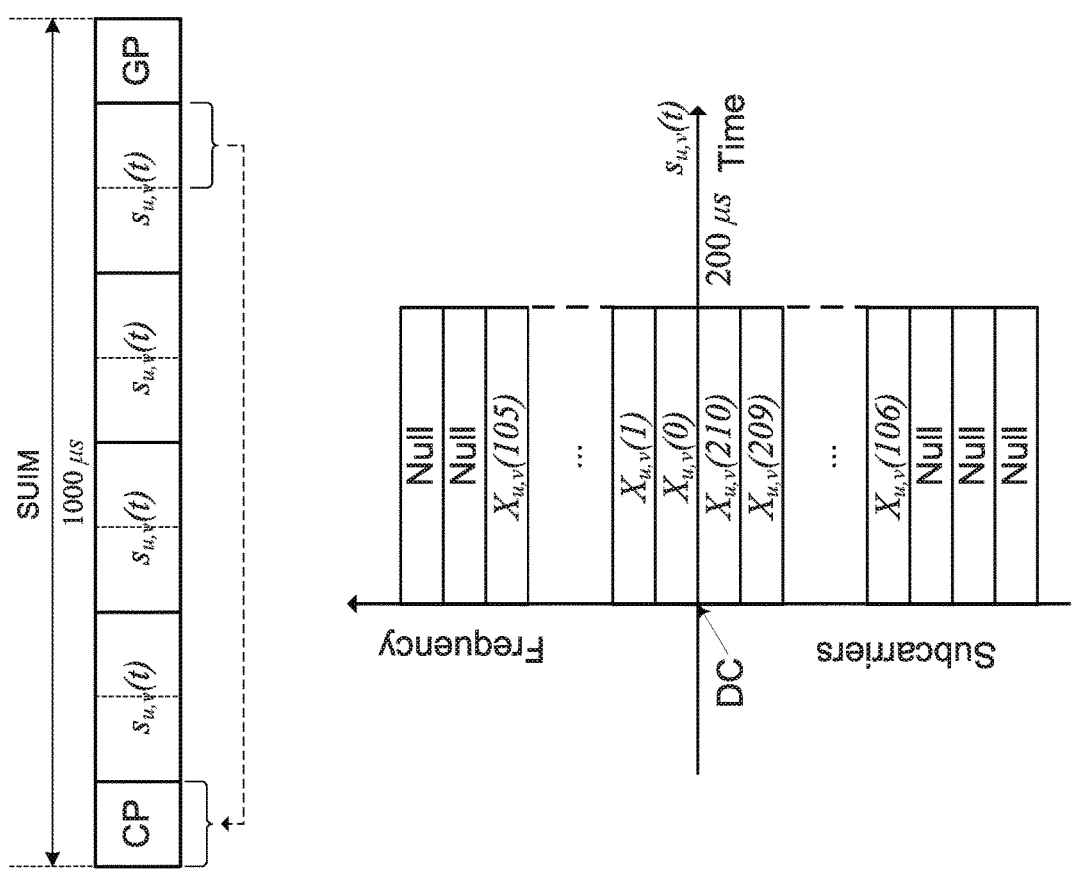
FIG. 8 is a time-domain and frequency-domain depiction of a probe signal emitted by a UE and destined for other UEs, in accordance with a non-limiting embodiment of the present invention.

For example, FIG. 8 shows a time-domain representation and a frequency-domain representation of an example probe signal that may be transmitted by the probe-emitting UE, namely PTX-UE. It is seen that in this example, the probe signal is divided into 1 ms time slots and the frequency carrier has a width of 1.08 MHz (corresponding, in fact, to 6 resource blocks having a size of 180 kHz each), divided into 216 sub-carriers having a sub-carrier spacing of $\Delta f_{probe}=5$ kHz. A 180 kHz resource block size is considered in an example LTE standard referred to as LTE E-UTRA Technical Specification, "Physical channels and modulation," 3GPP TS 36.211 version 12.8.0 Release 12, January 2016, hereby incorporated by reference herein. However, this should not be considered a limitation of the present invention. As such, the term "resource block", unless used specifically in the context of a specific LTE standard having a specific definition, may refer to any allocated section of the RF frequency spectrum and time spectrum.

In an embodiment, a 1 ms width of each time slot can be chosen for consistency with the LTE standard. The sub-carrier spacing can be set to 5 kHz in order to make the measurement robust to Doppler frequency offset. This is to suggest a potential high speed (500 km/h) application at a 5 GHz band, thus guaranteeing that the Doppler offset in this case is less than half of the sub-carrier spacing. However, the duration of the time slot and the width of the sub-carriers are chosen for example purposes only and may be different in different applications or implementations.

The time-domain representation of the probe signal includes a cyclic prefix (denoted $T_{CP,min}$) and a guard period (denoted $T_{GP,min}$). In this embodiment, the cyclic prefix (at the beginning) is copy of a part of the "base symbol" (see below) and the guard period (at the end) is blank (null) so as to avoid inter-symbol interference with other signals that may be transmitted by the probe-emitting UE during the previous and subsequent time slots, and which need not be probe signals, as ordinary uplink traffic may be sent during those neighboring time slots. Also, in this embodiment, the guard period and the cyclic prefix have the same duration, although this need not be the case in all embodiments.

The time-domain representation of the probe signal includes a base symbol $s_{u,v}(t)$, and this base symbol may be repeated a number of times, in this case four, but this need not be the case in all embodiments. In fact, in some embodiments, there need not be any repetition of the base symbol whatsoever. Further details regarding the base symbol in the context of the time-domain representation of the probe signal will now be provided.

Generally speaking, the guard period $T_{GP,min}$ and the cyclic prefix $T_{CP,min}$ should account for both the propagation delay and the delay spread of multipath channel between UEs. To guarantee that there is no interference from the probe-emitting UE (PTX-UE) to normal uplink and downlink traffic being processed at the base station, a minimum guard period spanning the duration of a round trip from the UE to the base station may be beneficial. For the probe-receiving UEs (PRX-UEs), the minimum guard period is dictated by the maximum propagation delay between any two UEs in a cell.

There are two cases to consider for the maximum propagation delay between two UEs in a cell being serviced by a base station. FIG. 9A shows the case where one UE (UE1) is very close to the base station and another UE (UE2) is close to the cell edge. In this case, the UE1's downlink time slot (or subframe) boundary differs from that of UE2 and the difference approaches the maximum delay when UE1 approaches the base station at the center of the cell and UE2 approaches the edge of the cell.

It will be appreciated that the maximum propagation delay occurs at UE1's downlink subframe when UE2 is the PTX-UE and UE1 is one of the PRX-UEs. The propagation distance corresponding to the delay relative to UE1's sub-frame boundary is given by:

$$d_{SF}=r_2-r_1+d=r_2-r_1+\sqrt{r_2^2+r_1^2-2r_2r_1\cos(\theta)}$$

where $r_1$ and $r_2$ are the distance from the base station to UE1 and UE2, respectively, and where d is the distance and θ is the angle between UE1 and UE2. Clearly, the maximum of $d_{SF}$ arrives when UE2 is on the cell edge ($r_2=r$) and θ=180°. That is:

$$d_{SF,max}=2r.$$

The second case, as shown in FIG. 9B, occurs when UE1 and UE2 have equal distance to the base station and their subframe boundaries are aligned. The propagation delay in either UE1's or UE2's subframe would be the same regardless of which of them is the PTX-UE and which is one of the PRX-UEs. The propagation distance corresponding to the delay relative to the UEs' subframe boundary is simply:

$$d_{SF}=d=\sqrt{r_2^2+r_1^2-2r_2r_1\cos(\theta)}$$

Here, the maximum of $d_{SF}$ occurs when UE1 and UE2 are both on the cell edge ($r_1=r_2=r$) and θ=180°, which in fact results in the same maximum as in the previous case.

As such, it can be summarized from the above that the maximum propagation delay for the design of the probe signal should account for twice the cell size.

Turning now to the minimum CP length and guard period for the probe signal, one needs to account for the maximum delay spread of multipath channel between UEs. This factor can be deduced from the LTE specification where maximum cyclic prefix length is $$\frac{512}{30.72}=16.67\ \mu s,$$

based on the extended cyclic prefix. Therefore, the minimum guard time or cyclic prefix length for the probe signal can be calculated as:

$$T_{GP,min}=T_{CP,min}=\frac{2r}{c}+512T_s$$

where r is the cell size (radius), $c=3\times10^8$ m/s, is the speed of light and $$T_s=\frac{10^{-6}}{30.72}$$

seconds, is the base time unit in the LTE standard.

From the above two possible minimum values for $T_{GP,min}$ and $T_{CP,min}$, it will be noticed that the term $$\frac{2r}{c}$$

dominates for small cells (e.g., of less than approximately 10 km in radius).

Another potential design parameter in relation to generation of the probe signal can be referred to as the "timing advance" and can be set by the PTX-UE. However, it should be appreciated that the timing advance should be set to zero because of the unknown distances between UEs. A nonzero timing advance may result in a time of arrival of the probe signal at one of the PRX-UEs that is earlier than that UE's downlink subframe boundary. This would cause interference to the subframe before the subframe reserved for the probe signal. It would also cause difficulty detecting the probe signal at the PRX-UEs because of the unknown timing advance. This can be illustrated by the UE locations in FIG. 9A, in the case where UE1 is the transmitter and UE2 is the receiver. When θ=0°, the distance between the two UE's becomes $d=r_2-r_1$, which is the same as the difference in their respective distances to the base station. Therefore the probe signal would arrive ahead of UE2's downlink subframe boundary if the timing advance were greater than zero. It is further noted that imposing a zero-timing-advance condition would not cause any interference to the subframes at the base station because the guard period takes care of the maximum round trip delay between any UE and the base station. It also obviates the need for uplink synchronization to the base station such that a UE would be ready to make a probe signal measurement in any radio resource control (RRC) states.

An example of the base symbol is now described. In an example, and with reference again to FIG. 8, the sub-carrier spacing is $\Delta f_{probe}=5$ kHz. This gives a base symbol duration of $$T_{zc} = \frac{1}{\Delta f_{probe}} = 200 \text{ μs},$$

and the total number of available sub-carriers in the resource block is 216 (=$1080/\Delta f_{probe}$) Leaving 5 sub-carriers for the guard band (2 at one end, 3 at the other, and a ½ sub-carrier offset for the probe signal as a whole), the number of usable sub-carriers is $N_{zc}=211$. This is a prime number, and thus is particularly suitable for certain types of zero correlation zone (ZCZ) sequences. For example, a so-called Zadoff-Chu sequence may be favoured due to its low peak-to-average-power (PAPR) property. The base symbol for the probe signal can be a u-th root Zadoff-Chu sequence given by $$x_u(n) = e^{-\frac{j\pi u n(n+1)}{N_{zc}}}, 0 \le n \le N_{zc} - 1.$$

A number $K_{zc}$ of Zadoff-Chu sequences, $x_{u,v}(n)$, which are orthogonal within $M_{zc}$ (the ZCZ zone) can be constructed by cyclic shifting $x_u$ (n):

$$x_{u,v}=x_u(n+C_v,\mod N_{zc}), 0 \le v \le K_{zc}-1$$

where $$K_{zc}=\lfloor N_{zc}/M_{zc}\rfloor, C_v=vM_{zc}$$

The ZCZ zone size $M_{zc}$ is directly set by the guard period $T_{GP,min}$ or the cyclic prefix $T_{CP,min}$ proportionally. The base symbol in the frequency domain after DFT preceding is given by:

$$X_{u,v}(k) = \sum_{n=0}^{N_{zc}-1} x_{u,v}(n) \cdot e^{-\frac{j2\pi nk}{N_{zc}}}, 0 \le k \le N_{zc}-1$$

and the base symbol in the time domain after IDFT is defined by:

$$s_{u,v}(t) = \sum_{k=0}^{N_{zc}-1} X_{u,v}(k) \cdot e^{j2\pi\left(k+\frac{1}{2}\right)\Delta f_{probe} t}, 0 \le t < T_{zc}$$

where $$T_{zc} = \frac{1}{\Delta f_{probe}} = 200 \text{ μs}$$

(or 6144 $T_s$ in LTE base time units) is the duration of the base symbol in the time domain.

Since in some embodiments, the cell in question may be a small cell where the cell radius can be assumed to be less than 10 km, the values of $T_{GP,min}$ and $T_{CP,min}$ should be at least 83.33 μs according to $$\frac{2r}{c} + 512T_s$$

as already described, or about 42% of the symbol length $T_{zc}$. The corresponding minimum ZCZ zone for $x_{u,v}(n)$ could be $M_{zc,min}=89$ and $K_{zc}=2$ ($M_{zc}$ can actually be extended to the maximum 105 while keeping the same value of $K_{zc}$).

The base symbol $s_{u,v}(t)$ is then, in this example, repeated 4 times consecutively to extend to 800 μs (or 24,576 times $T_s$ in LTE base time units) in a single 1 ms subframe. The remaining time in a subframe can be evenly divided for $T_{GP}$ and $T_{CP}$ (100 μs each, or 3,072 times $T_s$ in LTE base time units).

It is noted that orthogonality of the probe signal concatenated from multiple repetitions of $s_{u,v}(t)$ is still maintained. The number of orthogonal probe signals is the same as that of the constituent symbol $s_{u,v}(t)$, which is 2 ($K_{zc}$) in this example, thereby promoting simultaneous, interference-free and collision-free measurements for two groups of UEs. Thus, multiple probe signals may be issued by different UEs acting as a probe-emitting UE in different groups. To this end, it is within the scope of certain embodiments for different groups to use Zadoff-Chu sequences with different roots, as there is a low cross-correlation among such sequences with different roots.

It should be understood that the design parameters in the above examples are merely for illustrative purposes and that the choices of parameters, such as the sub-carrier spacing, the total length of the probe signal ($T_{probe}$) and the type of base symbol can be tailored for different applications and performance requirements.

Figure 10:
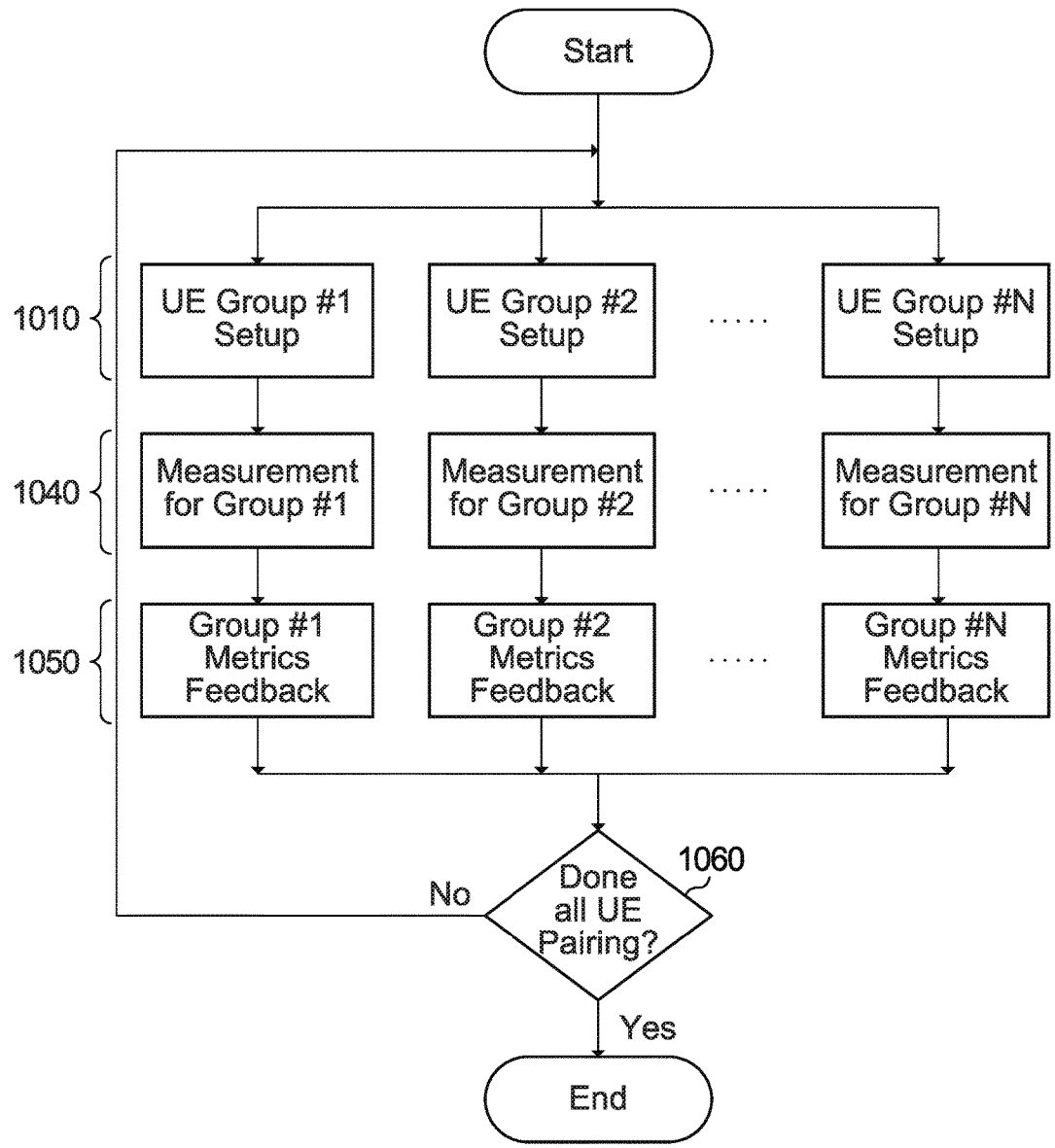
FIG. 10 is a flowchart illustrating probe signal feedback measurement for multiple groups.

As mentioned, it is envisaged that multiple "groups" may be involved in transmission and reception of respective probe signals at the same time, which is made possible through probe signal orthogonalization. In that sense, reference is made to FIG. 10, which shows a flowchart of a process implemented by the scheduler 510 in accordance with a non-limiting embodiment of the present invention. Basically, for each group, at step 1010, the scheduler 510 sets of a group of UEs, designates one of the UEs in each group as being the emitter of a "probe signal" and sends control information to the probe-emitting UE and the probe-receiving UEs in each group. This is similar to steps 610, 620 and 630 described earlier. It is noted that multiple instantiations of step 1010 (for multiple groups) may be performed in sequence or in parallel or in an overlapping way. At step 1040, similar to step 640, the scheduler 510 receives response messages from one or more of the probe-receiving UEs in each group, where the response message may include a measurement of a parameter made by the probe-receiving UEs in that group. At step 1050, similar to step 650, based on feedback on the parameter measurements received from various probe-receiving UEs, the scheduler 510 may determine which probe-receiving UE in each group should be paired with the probe-emitting UE in that group, for a given resource block. This pairing is stored in memory (e.g., the memory of the scheduler 510) and then used for subsequent data traffic exchanges with the various UEs in the group. At step 1060, the scheduler 510 verifies to make sure that all UEs in each group have been paired and if not, continues the process described above.

Those of skill in the art will appreciate that although the above description has made reference to interference measurement in order to choose minimum-interference scenarios and enhance performance, other areas of application may benefit from a similarly transmitted, received and processed probe signal. For example, applications in the field of proximity detection may perform in an improved way if the transmission and reception of probe signals affords a more precise or less computationally intense or more bandwidth-efficient calculation of a particular UEs location. For instance, the PTX-UE may utilize a portion of the frequency spectrum to determine locations of PRX-UEs in its vicinity without consuming bandwidth that the base station has reserved for other tasks. In other applications, aspects of the present invention may provide improved Internet tethering by identifying pairs of UEs that are more likely to be able to tether to one another and thus extend "piggyback" network access to one another. Still further applications will become apparent to those of ordinary skill in the art.

In addition, those skilled in the art will realize that the time and frequency multiplexing discussed above is merely an example, and that other forms of multiplexing and/or other resources, including optical/wavelength, code, etc., may also be deployed to a greater potential using certain aspects of the present invention.

Also, it should be appreciated that much can be done using the interference data collected by the feedback mechanism described above. For instance, since what is being measured is mutual interference, the values are expected to be substantially reciprocal, i.e., the interference from UE1 to UE2 is substantively equal to the interference from UE2 to UE1 assuming, of course, that the time, frequency and other parameters remain the same. Therefore, it may be possible to obtain a complete mutual interference portrait for N devices by making only ½ ($N^2-N$) measurements. Furthermore, the collected information can be updated dynamically at a rate chosen by an administrator and can be driven by factors such as distance or speed of individual UEs (relative to a fixed frame of reference or relative to one another), staleness of the interference data stored on record, etc.

It should be appreciated that certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein. In some examples of implementation, any feature of any embodiment discussed herein may be combined with any feature of any other embodiment discussed herein.

Although various embodiments and examples have been presented, this was for the purpose of describing, but not limiting, the invention. Various modifications and enhancements will become apparent to those of ordinary skill in the art and are within the scope of the invention, which is defined by the appended claims.

What is claimed is:

1. A method, comprising:
   identifying a group of user equipment (UEs) in a radio access network that includes at least a first base station and a second base station, the group including a transmitting UE and a plurality of receiving UEs, wherein at least one of the plurality of receiving UEs is a first UE associated with the first base station and at least another one of the plurality of receiving UEs is a second UE associated with the second base station;
   sending control information including probe signal parameters to the transmitting UE and to the plurality of receiving UEs; and
   receiving, from given ones of the plurality of receiving UEs including the first UE associated with the first base station and the second UE associated with the second base station, performance metrics relating to receipt of a probe signal sent by the transmitting UE based on the probe signal parameters.

2. The method defined in claim 1, further comprising:
   selecting one of the given ones of the plurality of receiving UEs based on the performance metrics;
   pairing the transmitting UE with the selected one of the given ones of the plurality of receiving UEs;
   assigning a resource block to the selected one of the given ones of the plurality of receiving UEs for downlink transmission from one of the first base station and the second base station in the radio access network and assigning the same resource block to the transmitting UE for uplink transmission to the one of the first base station and the second base station.

3. The method defined in claim 2, further comprising instructing the transmitting UE to transmit uplink traffic to the one of the first base station and the second base station over the assigned resource block and instructing the selected one of the given ones of the plurality of receiving UEs to receive downlink traffic from the one of the first base station and the second base station over the assigned resource block.

4. The method defined in claim 1, wherein the probe signal parameters include a resource block associated with the probe signal.

5. The method defined in claim 4, wherein the resource block associated with the probe signal comprises a time slot and a frequency carrier.

6. The method defined in claim 4, wherein the probe signal parameters include at least one of a guard period, a cyclic prefix, a sub-carrier mapping, a sub-carrier spacing, a base symbol duration and parameters for a zero-correlation-zone (ZCZ) sequence.

7. The method defined in claim 1, wherein a performance metric received from a particular one of the given ones of the plurality of receiving UEs is indicative of UE-to-UE mutual interference from the transmitting UE on the particular one of the given ones of the plurality of receiving UEs.

8. The method defined in claim 1, wherein a performance metric received from a particular one of the given ones of the plurality of receiving UEs is indicative of signal strength of the probe signal as detected by the particular one of the given ones of the plurality of receiving UEs.

9. The method defined in claim 1, wherein a performance metric received from a particular one of the given ones of the plurality of receiving UEs is indicative of signal-to-noise ratio of the probe signal as detected by the particular one of the given ones of the plurality of receiving UEs.

10. The method defined in claim 1, wherein a performance metric received from a particular one of the given ones of the plurality of receiving UEs is indicative of an error rate or detection probability of the probe signal as detected by the particular one of the given ones of the plurality of receiving UEs.

11. The method defined in claim 1, wherein the control information sent to the transmitting UE is different from the control information sent to the plurality of receiving UEs.

12. A scheduler for use in a radio access network that includes at least a first base station and a second base station, the scheduler comprising a processor and a memory operatively coupled to the processor, the memory storing computer-readable instructions, the processor configured to configured to execute the instructions to carry out a method that comprises:
  identifying a group of user equipment (UEs) in the radio access network, the group including a transmitting UE and a plurality of receiving UEs, wherein at least one of the plurality of receiving UEs is a first UE associated with the first base station and at least another one of the plurality of receiving UEs is a second UE associated with the second base station;
  sending control information including probe signal parameters to the transmitting UE and to the plurality of receiving UEs; and
  receiving, from given ones of the plurality of receiving UEs including the first UE associated with the first base station and the second UE associated with the second base station, performance metrics relating to receipt of a probe signal sent by the transmitting UE based on the probe signal parameters.

13. A non-transitory computer-readable storage medium comprising computer-readable instructions which, when executed by a processor of a scheduler for use in a radio access network, cause the scheduler to:
  identify a group of user equipment (UEs) in a radio access network that includes at least a first base station and a second base station, the group including a transmitting UE and a plurality of receiving UEs, wherein at least one of the plurality of receiving UEs is a first UE associated with the first base station and at least another one of the plurality of receiving UEs is a second UE associated with the second base station;
  send control information including probe signal parameters to the transmitting UE and to the plurality of receiving UEs; and
  receive, from given ones of the plurality of receiving UEs including the first UE associated with the first base station and the second UE associated with the second base station, performance metrics relating to receipt of a probe signal sent by the transmitting UE based on the probe signal parameters.

14. A method for execution by a plurality of receiving user equipment (receiving UEs) in a radio access network that includes at least a first base station and a second base station, comprising:
  each of the plurality of receiving UEs receiving a respective received version of a same probe signal emitted from a transmitting UE in the radio access network;
  each of the plurality of receiving UEs determining a respective performance metric relating to receipt of the probe signal from the transmitting UE;
  some of the plurality of receiving UEs sending via the first base station the respective performance metric to a scheduler connected to the radio access network;
  others of the plurality of receiving UEs sending via the second base station the respective performance metric to a scheduler connected to the radio access network.

15. The method defined in claim 14, wherein the probe signal is received directly from the transmitting UE without going through any base station in the radio access network including the first base station and the second base station.

16. The method defined in claim 14, further comprising:
  said some of the plurality of UEs receiving control information including probe signal parameters from the first base station in the radio access network;
  said others of the plurality of UEs receiving control information including probe signal parameters from the second base station in the radio access network.

17. The method defined in claim 16, wherein the probe signal parameters include a resource block associated with the probe signal.

18. The method defined in claim 17, wherein the resource block associated with the probe signal comprises a time slot and a frequency carrier.

19. The method defined in claim 17, wherein the probe signal parameters include at least one of a guard period, a cyclic prefix, a sub-carrier mapping, a sub-carrier spacing, a base symbol duration and parameters for a zero-correlation-zone sequence.

20. The method defined in claim 14, wherein the respective performance metric is indicative of UE-to-UE mutual interference from the transmitting UE on the respective one of the given ones of the plurality of receiving UEs.

21. The method defined in claim 14, wherein the respective performance metric is indicative of signal strength of the probe signal as detected by the respective one of the given ones of the plurality of receiving UEs.

22. The method defined in claim 14, wherein the respective performance metric is indicative of signal-to-noise ratio of the probe signal as detected by the respective one of the given ones of the plurality of receiving UEs.

23. The method defined in claim 14, wherein the respective performance metric is indicative of an error rate/detection probability of the probe signal as detected by the respective one of the given ones of the plurality of receiving UEs.

24. The method defined in claim 14, wherein sending the respective performance metric to a scheduler connected to the radio access network occurs over an uplink channel of the radio access network.

25. A first receiving user equipment (UE) and a second receiving UE in a radio access network that includes a first base station associated with the first receiving UE and a second base station associated with the second receiving UE, wherein:
  the first receiving UE is configured to:
    receive a first received version of a probe signal emitted from a transmitting UE in the radio access network;
    determine a first performance metric relating to receipt of the probe signal from the transmitting UE; and
    send the first performance metric via the first base station to a scheduler connected to the radio access network;
  the second receiving UE is configured to:
    receive a second received version of the same probe signal emitted from the transmitting UE in the radio access network;
    determine a second performance metric relating to receipt of the probe signal from the transmitting UE; and
    send the second performance metric via a second base station to the scheduler.

* * * * *